United States Patent
Zheng et al.

(10) Patent No.: US 11,899,154 B2
(45) Date of Patent: Feb. 13, 2024

(54) DAS SAME-WELL MONITORING REAL-TIME MICROSEISMIC EFFECTIVE EVENT IDENTIFICATION METHOD BASED ON DEEP LEARNING

(71) Applicant: Institute of Geology and Geophysics, Chinese Academy of Sciences, Beijing (CN)

(72) Inventors: Yikang Zheng, Beijing (CN); Yibo Wang, Beijing (CN); Shaojiang Wu, Beijing (CN); Yi Yao, Beijing (CN)

( * ) Notice: Subject to any disclaimer, the term of this patent is extended or adjusted under 35 U.S.C. 154(b) by 0 days.

(21) Appl. No.: 18/324,104

(22) Filed: May 25, 2023

(65) Prior Publication Data
US 2023/0296800 A1    Sep. 21, 2023

(30) Foreign Application Priority Data
Jul. 11, 2022  (CN) .......................... 202210807860.0

(51) Int. Cl.
*G01V 1/48*  (2006.01)
*G06N 3/084*  (2023.01)

(52) U.S. Cl.
CPC ............... *G01V 1/48* (2013.01); *G06N 3/084* (2013.01)

(58) Field of Classification Search
CPC .......... G01V 1/48; G01V 1/288; G01V 1/282; G01V 1/40; G06N 3/084; G06N 3/045; G06N 3/08; G06F 18/214; G06F 18/2431; G06F 2218/12
See application file for complete search history.

(56) References Cited

PUBLICATIONS

Wamriew et al., Deep Neural Networks for Detection and Location of Microseismic Events and Velocity Model Inversion from Microseismic Data Acquired by Distributed Acoustic Sensing Array, Published: Oct. 5, 2021, Sensors 2021, 21, 17 pp. (Year: 2021).*

* cited by examiner

*Primary Examiner* — Toan M Le
(74) *Attorney, Agent, or Firm* — IPGentleman Intellectual Property Services, LLC; Addison D. Ault; Richard P. Moerschell

(57) ABSTRACT

Embodiments of the present disclosure provide a DAS same-well monitoring real-time microseismic effective event identification method based on deep learning, including: constructing a DAS-based horizontal well microseismic monitoring system; constructing a training data set, including microseismic event data, pipe wave data and background noise data with different types of labels; constructing a signal identification module; training the signal identification module by using the training data set; preprocessing actual monitoring data, inputting the preprocessed data into the signal identification module to obtain an output result; marking microseismic events identified in the output result, and updating the marked microseismic events into the training data set; and adjusting and updating the signal identification module. The identification method according to the present disclosure can identify microseismic events in DAS same-well monitoring data in real time and efficiently.

10 Claims, 3 Drawing Sheets

DAS SAME-WELL MONITORING REAL-TIME MICROSEISMIC EFFECTIVE EVENT IDENTIFICATION METHOD BASED ON DEEP LEARNING

CROSS-REFERENCE TO RELATED APPLICATION

This application claims priority to Chinese Patent Application No. 202210807860.0, filed on Jul. 11, 2022 before the China National Intellectual Property Administration, the disclosure of which is incorporated herein by reference in entirety.

TECHNICAL FIELD

The present disclosure relates to the field of microseismic monitoring and deep learning. In particular, the disclosure relates to a DAS same-well monitoring real-time microseismic effective event identification method based on deep learning, wherein the method includes using a training data set to train a signal identification module, preprocessing actual monitoring data, inputting the preprocessed data into the signal identification module to obtain an output result, etc. Therefore, the present disclosure belongs to the field of seismic data processing in seismic exploration or detection.

BACKGROUND

Hydraulic fracturing technology relates to injection of high-pressure fluid into shale reservoirs to generate complex artificial fractures, which can increase the connectivity of reservoirs and increase well production. Monitoring and evaluating the effects of hydraulic fracturing on reservoir substructures in different stages is a prerequisite for efficient exploitation and safe production.

Microseismic monitoring technology is an important means for real-time monitoring of hydraulic fracturing stimulation of unconventional resource exploration. Microseismic monitoring technology evaluates fracturing effects by monitoring microseismic signals generated during hydraulic fracturing, and then improves and optimizes engineering parameters. Microseismic monitoring mainly includes effective event detection, effective event signal enhancement, microseismic source location, microseismic source analysis, reservoir stress analysis and reservoir fracture calculation, etc.

Distributed Acoustic Sensing (DAS) is an emerging data acquisition technology that has developed rapidly in recent years. DAS generally consists of a demodulator (including an optical system and a signal acquisition system) and a normal optical fiber or a special optical fiber for sensing. DAS realizes the measurement of strain signal along the axial direction of the optical fiber by detecting a phase change of Rayleigh backward scattering light generated by the laser pulse in the internal scatter of the optical fiber.

In DAS hydraulic fracturing monitoring, DAS optical fibers are generally arranged along the horizontal well. Compared with conventional geophone detection, DAS can obtain the measurement data of the whole well section, which greatly increases the azimuth of data collection; DAS has 1 m spatial sampling, which significantly improves the acquisition density and spatial continuity of the monitoring data. However, the microseismic monitoring is a long-term and continuous process, and the amount of monitoring data is very large. For example, taking a single well with a depth of 2000 meters as an example, if the time sampling interval of DAS is 1 millisecond and the spatial sampling interval is 1 meter, nearly 650 GB of data can be obtained in one day. Therefore, manual data analysis or conventional methods cannot meet the needs of microseismic real-time monitoring.

DAS monitoring is generally divided into adjacent well monitoring and same well monitoring. In the same well monitoring, the monitoring well and the fracturing well are the same horizontal well. Due to fluid injection, a pipe wave with strong energy would be generated during the working process of the fracturing pump, it exceeds the amplitude of effective microseismic events. The pipe wave propagates along the monitoring well and has strong periodicity. On the one hand, the frequency bands of the pipe wave and the effective microseismic event overlap in the frequency domain; on the other hand, the waveforms of the two are similar in the time domain. Therefore, it is difficult to separate the pipe wave from the target microseismic event, thereby seriously affecting the identification of effective microseismic events. In the adjacent well monitoring, the monitoring well and the fracturing well are different horizontal wells, and the pipe wave propagating along the fracturing well does not exist in the data.

At present, there is no event detection method for DAS same-well monitoring data. The literature and patents having similar methods include: picking up microseismic data of a conventional geophone; picking up DAS data of adjacent wells. However, the difference between the geophone data and the DAS data is very large, and they are not comparable. For the picking of the DAS data of adjacent wells, since the conventional microseismic data does not contain pipe wave, the identification method thereof does not involve the pipe wave data, therefore the method for picking DAS data of adjacent wells is relatively simple.

SUMMARY

The purpose of the present disclosure is to at least partly overcome the defects of the prior art, and provide a DAS same-well monitoring real-time microseismic effective event identification method based on deep learning.

In an embodiment, the present disclosure provides a real-time identification method for DAS same-well monitoring microseismic events, so as to further utilize the microseismic events for analysis, fracturing evaluation and construction guidance.

In an embodiment, the present disclosure provides a microseismic event identification method, which can automatically adjust and update the signal identification module to improve the adaptability of the module.

In an embodiment, the present disclosure provides a DAS same-well monitoring real-time microseismic effective event identification method based on deep learning, which has one or more advantages of high computing efficiency, high accuracy, low algorithm structure complexity and low computing cost.

In order to achieve the above-mentioned embodiments, the technical solutions of the present disclosure are as follows:

A DAS same-well monitoring real-time microseismic effective event identification method based on deep learning, comprising:
 constructing a DAS-based horizontal well microseismic monitoring system;
 constructing a training data set, comprising microseismic event data, pipe wave data and background noise data with different types of labels;

constructing a signal identification module composed of a deep neural network, wherein the network comprises a convolution sub-network and an attention mechanism sub-network; input data of the signal identification module uses two convolution layers to extract basic features, with a data size of 256×256, and a convolution kernel of 32×3×3; the convolution sub-network comprises 2 convolution layers, with a data size of 256×256, and a convolution kernel of 32×3×3; where first dimension is a number of convolution, second dimension and third dimension are convolution size; the attention mechanism sub-network comprises 1 convolution layer and 2 pooling layers, the convolution layer has a data size of 256×256, and a convolution kernel of 32×3×3; the 2 pooling layers comprise 1 average pooling layer and 1 maximum pooling layer, the 2 pooling layers are connected to each other by a connected layer, and then use the convolution layer with a data size of 128×128, and a convolution kernel of 64×3×3; the convolution sub-network and the attention mechanism sub-network are connected to each other by a connected layer, and then two convolution layers with a data size of 128×128, and a convolution kernel of 64×3×3 are used; then, 2 fully connected layers with a size of 1024×1 are used; an input of the signal identification module comprises the microseismic event data, pipe wave data and background noise data with different types of labels, and an output of the signal identification module comprises a predicted label value, network parameters are updated by using an error of the predicted label value and an accurate label value; the network uses cross entropy as a loss function to calculate an error of the neural network;

training the signal identification module by using the training data set;

preprocessing actual monitoring data, inputting the preprocessed data into the signal identification module to obtain an output result; marking microseismic events identified in the output result, and updating the marked microseismic events into the training data set; and adjusting and updating the signal identification module.

According to some embodiments of the present disclosure, the constructing a training data set comprises:

generating initial data of the microseismic event data, the pipe wave data and the background noise data;

data-augmenting the initial data of the microseismic event data, the pipe wave data and the background noise data; and preprocessing all data.

According to some embodiments of the present disclosure, the initial data of the microseismic event data comprises a first part of data and a second part of data, the first part of data is data formed by adding actual collected pipe waves to artificially simulated and composited data which do not comprise pipe waves and background noise; the second part of data is microseismic event data obtained from actual monitoring and comprising pipe waves and background noise;

wherein the initial data of the pipe wave data is pipe wave data obtained from actual monitoring of the fracturing platform at an initial stage of fracturing; and/or wherein the initial data of the background noise data is mechanical noise of wellhead operation obtained through a same-well monitoring of an adjacent fracturing platform.

According to some embodiments of the present disclosure, the data-augmenting the initial data of the microseismic event data, the pipe wave data and the background noise data comprises:

scaling amplitudes of the microseismic data, amplitudes of the pipe wave data and amplitudes of the background noise data according to random ratios.

According to some embodiments of the present disclosure, the preprocessing all data comprises:

performing interpolation and replacement to damaged channel data by adjacent channels, removing mean value, removing abnormally large value, replacing the removed abnormally large value by interpolation, and performing data normalization.

According to some embodiments of the present disclosure, the signal identification module is composed of a deep neural network; the network comprises a convolution sub-network and an attention mechanism sub-network; input data of the signal identification module uses 2 convolution layers to extract basic features, with a data size of 256×256; based on the feature information, the convolution sub-network comprises 2 convolution layers, with a data size of 256×256; the attention mechanism sub-network comprises 1 convolution layer and 2 pooling layers, the convolution layer has a data size of 256×256, the 2 pooling layers comprise 1 average pooling layer and 1 maximum pooling layer, the 2 pooling layers are connected to each other by a connected layer, and then use the convolution layer with a data size of 128×128; the convolution sub-network and the attention mechanism sub-network are connected to each other by a connected layer, and then two convolution layers with a data size of 128×128 are used; then, 2 fully connected layers with a size of 1024×1 are used, and then a classification result is outputted through SoftMax, and the result is outputted through 3 channels as 3 type labels of the signal identification module.

According to some embodiments of the present disclosure, the training the signal identification module by using the training data set comprises:

dividing the data set into a training set and a test set with a ratio of 8:2;

letting a neural network model adopt a stochastic gradient descent optimization method; setting a dynamic learning rate, the initial value being set to 0.0001, reduced by half every 50 times; the batch size being set to 40; the number of iterations being 200; and training the neural network model on a graphics processing unit.

According to some embodiments of the present disclosure, the updating the marked microseismic events into the training data set is to update the marked microseismic events into the second part of the initial data of the microseismic event data.

According to some embodiments of the present disclosure, when the updated microseismic events reach a predetermined number, or the monitoring time reaches a predetermined period, the step of adjusting and updating the signal identification module is started.

According to some embodiments of the present disclosure, the adjusting and updating the signal identification module comprises:

freezing a network structure of a feature extraction layer, keeping parameters of the feature extraction layer unchanged, training a mapping relationship between a feature output layer and a fully connected layer by using all the updated microseismic events and some old microseismic events in the data set, extracting features output by the last layer, adjusting the module by using new data, and re-establishing the mapping relationship between the feature output layer and the fully connected layer;

obtaining new network model parameters and updating the signal identification module simultaneously.

According to some embodiments of the present disclosure, in the step of adjusting and updating the signal identification module, a transfer training is only performed on the mapping relationship between the feature output layer and the fully connected layer of the model, and the entire model is not trained, so as to improve training speed.

According to some embodiments of the present disclosure, the DAS-based horizontal well microseismic monitoring system comprises a metal sleeve and an armored optical cable fixedly arranged outside the metal sleeve, and a single-mode optical fiber is arranged in the armored optical cable;

wherein the constructing a DAS-based horizontal well microseismic monitoring system comprises:

inserting the metal sleeve and the armored optical cable into a drilled wellbore synchronously;

pumping cement slurry from a bottom of a well, letting the cement slurry return to a wellhead from the bottom of the well along an annular space between an outer wall of the metal sleeve and the wellbore, allowing the metal sleeve, the armored optical cable and formation rock to be fixed together after the cement slurry is solidified; and providing a DAS modem, and connecting the single-mode optical fiber in the armored optical cable to a DAS signal input port of the DAS modem at the wellhead.

According to some embodiments of the present disclosure, the preprocessing actual monitoring data comprises:

performing interpolation and replacement to damaged channel data by adjacent channels, removing mean value, removing abnormally large value, replacing the removed abnormally large value by interpolation, and performing data normalization.

The DAS same-well monitoring real-time microseismic effective event identification method based on deep learning according to the present disclosure can identify microseismic events in DAS same-well monitoring data in real time and efficiently, so as to further utilize the microseismic events for analysis, fracturing evaluation and construction guidance. During the monitoring process, new microseismic events will be generated, such microseismic events can be used to supplement the training data set, and then the newly updated data may be used to further update the signal identification module to improve the adaptability of the module. The identification method of the present disclosure has high operational efficiency, high accuracy, low algorithm structure complexity and low computing cost.

DETAILED DESCRIPTION OF EMBODIMENTS

In order to make the above objectives, features, and advantages of the present disclosure more understandable, the present disclosure will be described in further detail below with reference to the accompanying drawings and the specific embodiments.

The deep learning method is a good tool to solve difficult problems in the field of seismology and geophysical research. The application of deep learning in the field of seismology continues to expand. The two main categories of deep learning applications in seismology are supervised learning and unsupervised learning. Supervised learning needs label features to perform predictive modeling, it can be further classified into classification or regression according to different output data types (discrete or continuous). Unsupervised learning is suitable for mining hidden information, grouping target objects based on similarity (clustering) or reducing the dimensionality of input data (dimensionality reduction), and is often used in data mining, pattern identification and image processing. In addition, deep learning also includes semi-supervised learning (parallel learning of labeled data sets and unlabeled data sets), and different algorithms have their own advantages and disadvantages.

Figure 1:
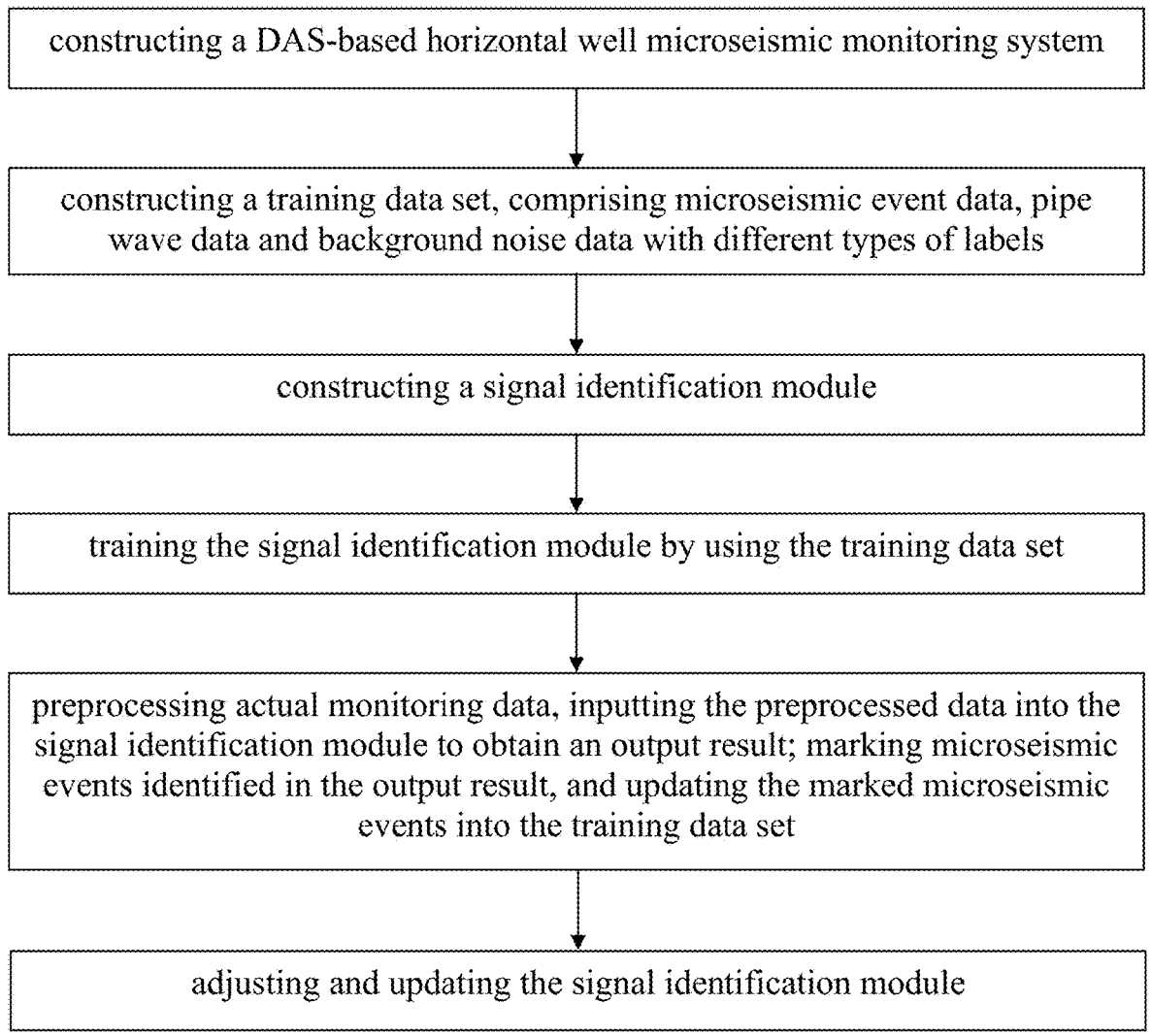
FIG. 1 is a flowchart of a DAS same-well monitoring real-time microseismic effective event identification method based on deep learning according to an embodiment of the present disclosure.
Figure 2:
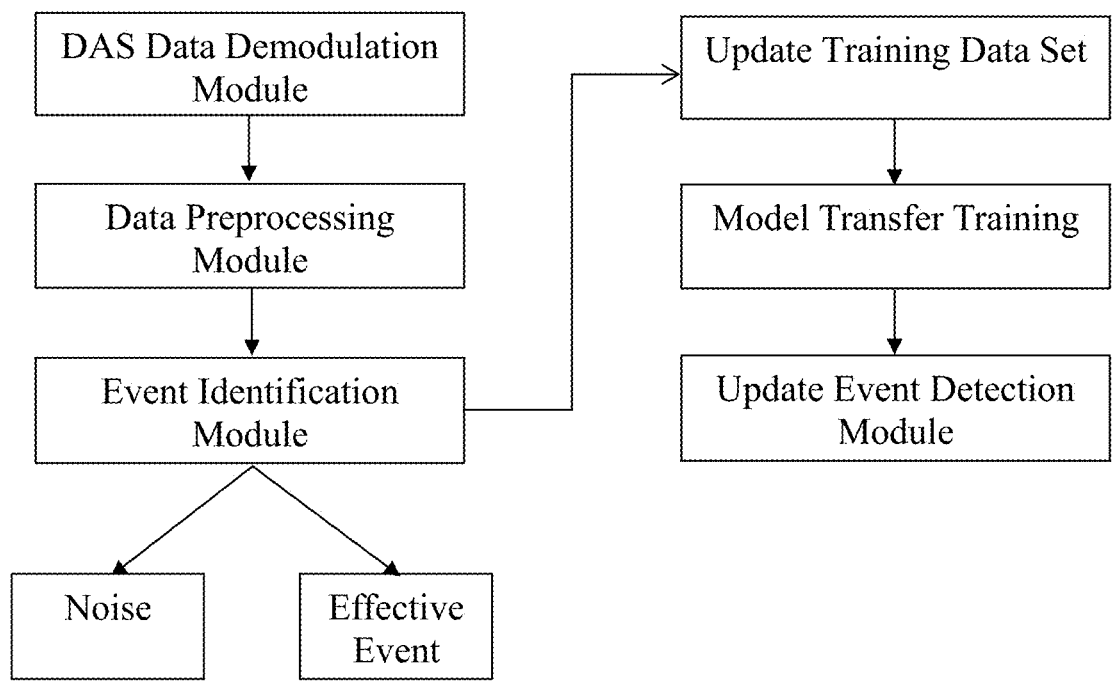
FIG. 2 shows a software data processing flow of a DAS same-well monitoring real-time microseismic effective event identification method based on deep learning according to an embodiment of the present disclosure.
Figure 3:
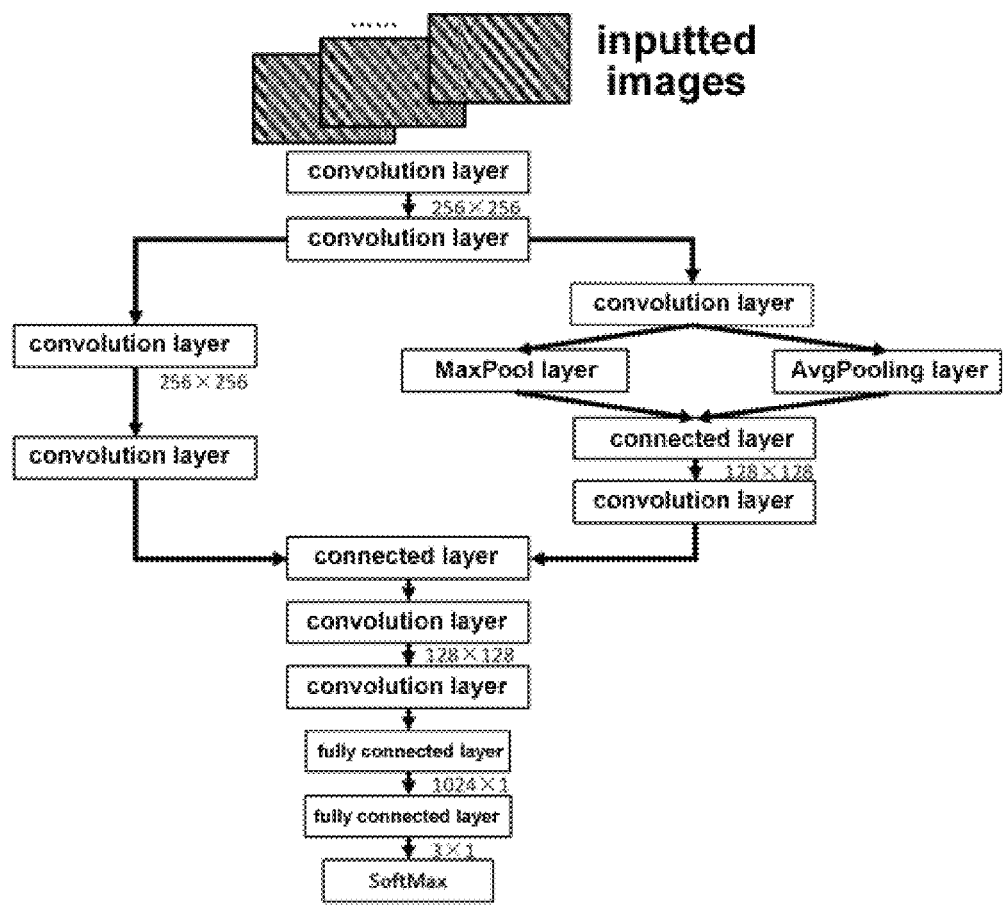
FIG. 3 is a schematic diagram of a network structure of a DAS same-well monitoring real-time microseismic effective event identification method based on deep learning according to an embodiment of the present disclosure.

The general inventive concept of the present disclosure is to realize real-time identification of DAS same-well monitoring microseismic events based on deep learning. According to a specific embodiment of the present disclosure, a DAS same-well monitoring real-time microseismic effective event identification method based on deep learning is proposed, and the identification method includes (as shown in FIG. 1):

Firstly, a DAS-based horizontal well microseismic monitoring system is constructed. The DAS-based horizontal well microseismic monitoring system comprises a metal sleeve and an armored optical cable fixedly arranged outside the metal sleeve, and a special single-mode optical fiber is arranged in the armored optical cable; the DAS modem is placed near a wellhead, the DAS signal port of the DAS modem is connected to the special single-mode optical fiber outside the metal sleeve.

Specifically, the construction of a DAS-based horizontal well microseismic monitoring system includes:

slowly and synchronously inserting the metal sleeve and the armored optical cable into a drilled wellbore;

installing a ring-shaped metal clamp at the joint of two metal sleeves at the wellhead to fix and protect the armored optical cable from moving and/or being damaged during the process of inserting the metal sleeve;

pumping cement slurry from the bottom of the well by a high-pressure pump truck, letting the cement slurry return to the wellhead from the bottom of the well along an annular space between an outer wall of the metal sleeve and the wellbore, allowing the metal sleeve, the armored optical cable and formation rock to be permanently fixed together after the cement slurry is solidified;

providing the DAS modem, and connecting the single-mode optical fiber in the armored optical cable to a DAS signal input port of the DAS modem at the wellhead;

continuously transmitting sound source signals in the metal sleeve by a sound source transmitter built in a downhole perforating gun, and orientating and positioning the armored optical cable arranged outside the metal sleeve in the whole section of the well according to the sound source signals that are transmitted from the downhole sound source transmitter and detected by the DAS modem;

adjusting the orientation and perforation position of the perforating bullet in the perforating gun, according to the measured position and orientation of the armored optical cable arranged outside the metal sleeve in the whole section of the well, and avoiding from breaking the armored optical cable arranged outside the metal sleeve during perforation by means of directional perforation operations.

After the completion of DAS facility layout, 3D surface seismic data in the area around the horizontal well is collected and preprocessed, and then a 3D seismic longitudinal wave velocity data body is obtained by using velocity inversion technology, and finally the 3D seismic longitudinal wave velocity data body is calibrated, adjusted and updated by means of acoustic logging velocity data, to obtain a preliminary seismic longitudinal wave velocity field of the formation around the horizontal well.

During hydraulic fracturing operation, the DAS-based horizontal well microseismic monitoring system may use the armored optical cables permanently arranged outside the metal sleeve to perform hydraulic fracturing microseismic monitoring. The single-mode optical fibers outside the metal sleeve arranged in the well are used to collect data, the data is transmitted to the DAS modem near the wellhead for demodulation, then the microseismic events are obtained, wherein the microseismic events are generated from the stimulated fracture of the underground reservoir of the offset well or in-well when the continuously-hydraulic fracturing operation is performed. Combining with the longitudinal wave velocity field of the underground reservoir obtained in the preceding step, relevant information of the microseismic events can be obtained, and such information includes the time, three-dimensional spatial position and energy magnitude of the microseismic events.

Only part of the monitored continuously-recorded data contains microseismic events, and therefore microseismic events in need of identification or classification.

After the identification or classification of the microseismic events is completed, all observed microseismic events can be analyzed according to the occurrence time, three-dimensional space position and energy magnitude of the microseismic events monitored in real time during the hydraulic fracturing operation, thereby obtaining the dynamic distribution and change of the microseismic events in three-dimensional space. This spatial change reflects the development of fractures in the underground reservoir, and thereby various parameters during the hydraulic fracturing operation can be optimized and adjusted in real time, based on this information.

After the hydraulic fracturing is completed, focal mechanism analysis and magnitude analysis can be performed according to the longitudinal wave signal characteristics of the recorded microseismic events, to obtain rupture mechanism of the most microseismic events, and analyze the distribution characteristic and regularity of fractures after the hydraulic fracturing operation. Based on the above information, an effective and reliable qualitative and quantitative evaluation of the reservoir hydraulic fracturing effect of this horizontal well may be carried out.

The DAS same-well monitoring real-time microseismic effective event identification method based on deep learning further includes:

Constructing a training data set:

1.1. Overview of the data set: the structure of the data set comprises: (2D data body, 1D type label). A total of 3 data types are included, namely: microseismic event data (including pipe wave interference of different amplitudes, can be considered as microseismic+pipe wave), the type label is 1; pipe wave data (with different amplitudes, excluding microseismic event), the type label is 2; background noise data (mechanical interference, etc.), the type label is 3. All data are of the same size. For a single data, a total of Nt (1000) channels are included, each channel has a total of Ns (1000) sampling points; a total of Nk (1000) data are included. Therefore, the data body is Nk*Ns*Nt and the type label is Nk*1.

The step of constructing a training data set is to generate initial data of the microseismic event data, the pipe wave data and the background noise data on the basis of the data set structure, and then perform data augmentation to the initial data of the microseismic event data, the pipe wave data and the background noise data, and then preprocess all the data.

1.2. Data generation: the initial data of the microseismic event data (label 1) includes a first part of data and a second part of data, the first part of data is data formed by adding actual collected pipe waves to artificially simulated and composited data which do not comprise pipe waves and background noise; the second part of data is microseismic event data obtained from actual monitoring and comprising pipe waves and background noise (especially pipe waves). The composited data can use different simulation parameters, including source location and source mechanism, etc., it has more data and better generalization; the second part of data has relatively less data. The initial data of the pipe wave data (label 2) is pipe wave data obtained from actual monitoring of the current fracturing platform at an initial stage of fracturing, and the amount of this data is relatively large. The initial data of the background noise data (label 3) is obtained from actual monitoring, it is generally the mechanical noise of wellhead operation, the actual monitoring data may be obtained through same-well monitoring of an adjacent fracturing platform.

1.3. Data augmentation: During the data generation process, the data is augmented to improve the universality of the data set. The augmentation method for the microseismic event data is as follows: the amplitudes of the microseismic data are scaled according to random ratios (for the composited data and the monitored same-well microseismic events, they are generally 0.5-2); abnormal traces (bad traces, missing traces) are constructed. The augmentation method for the pipe wave data is as follows: the amplitudes of the pipe wave data are scaled according to random ratios (generally 0.1-10). The augmentation method for the background noise data is as follows: the amplitudes of background noise (mechanical interference) are scaled according to random ratios (generally 0.5-2), and generally the scaling ratios of this part are small.

1.4. Data preprocessing: All data are preprocessed in the same method: performing interpolation and replacement to damaged channel data by adjacent channels, removing mean value, removing abnormally large value, replacing the removed abnormally large value by interpolation, and performing data normalization.

Constructing a signal identification module:

2.1. Module architecture: the signal identification module includes a convolution sub-network and an attention mechanism sub-network. Input data of the signal identification module uses two convolution layers to extract basic features, with a data size of 256×256, and a convolution kernel of 32×3×3. Based on this feature information, the convolution sub-network comprises 2 convolution layers, with a data size of 256×256, and a convolution kernel of 32×3×3, where first dimension is a number of convolution, second dimension and third dimension are convolution size; the attention mechanism sub-network comprises 1 convolution layer and 2 pooling layers, the convolution layer has a data size of 256×256, and a convolution kernel of 32×3×3; the 2 pooling layers comprise 1 average pooling layer and 1 maximum pooling layer, the 2 pooling layers are connected to each other by a connected layer, and then use the convolution layer with a data size of 128×128, and a convolution kernel of 64×3×3. the convolution sub-network and the attention mechanism sub-network are connected to each other by a connected layer, and then two convolution layers with a data size of 128×128, and a convolution kernel of 64×3×3 are used; then, 2 fully connected layers with a size of 1024×1 are used, and then a classification result is outputted through SoftMax. Finally, the result is outputted through 3 channels as 3 type labels of the signal identification module (labeled as 1, 2, 3).

2.2. Module IO: The input of the computational neural network is three different types of data, and the output is a predicted label value, network parameters are updated by using an error of the predicted label value and an accurate label value; the network uses cross entropy as a loss function to calculate an error of the neural network.

Training the signal identification module using the training data set:

3.1. dividing the data set into a training set and a test set with a ratio of 8:2.

3.2. letting a neural network model adopt a stochastic gradient descent optimization method; setting a dynamic learning rate, the initial value being set to 0.0001, reduced by half every 50 times; the batch size being set to 40; the number of iterations being 200.

3.3. training the neural network model on a graphics processing unit.

Preprocessing actual monitoring data, inputting the preprocessed data into the signal identification module to obtain an output result; marking microseismic events identified in the output result, and updating the marked microseismic events into the training data set:

4.1. Actual data preprocessing: all actual monitoring data are preprocessed in the same method: performing interpolation and replacement to damaged channel data by adjacent channels, removing mean value, removing abnormally large value, replacing the removed abnormally large value by interpolation, and performing data normalization.

4.2. The preprocessed data is inputted into the signal identification module to obtain the corresponding output result.

4.3. Mark the microseismic events identified in step 4.2, and update the marked microseismic events into the corresponding training data set of the microseismic events actually monitored in step 1.2, that is, the second part of data in the initial data of the microseismic event data.

Adjusting and updating the signal identification module:

5.1. Set the model update threshold: when the updated microseismic events reach a predetermined number, or the monitoring time reaches a predetermined period (for example, 1 day), the step of adjusting and updating the signal identification module is started.

5.2. During the fine-tuning process of the signal identification module, the network structure of the feature extraction layer is frozen, that is to say, the parameters of the feature extraction layer are kept unchanged, all the updated microseismic effective events and some old microseismic effective events in the data set (these two data are still Nk, keep the same number) are used to train the mapping relationship between the feature output layer and the fully connected layer, that is: extract the features output by the last layer, and use the new data to fine-tune the module, re-establish the mapping relationship between the feature output layer and the fully connected layer. A transfer training is only performed on the mapping relationship between the feature output layer and the fully connected layer of the model, and the entire model is not trained, therefore it can improve training speed.

5.3. Obtain new network model parameters and update the signal identification module simultaneously.

The DAS same-well monitoring real-time microseismic effective event identification method based on deep learning according to the present disclosure can identify microseismic events in DAS same-well monitoring data in real time and efficiently, so as to further utilize the microseismic events for analysis, fracturing evaluation and construction guidance. During the monitoring process, new microseismic events will be generated, such microseismic events can be used to supplement the training data set, and then the newly updated data may be used to further update the signal identification module to improve the adaptability of the module. The identification method of the present disclosure has high operation efficiency, high accuracy, low algorithm structure complexity and low computing cost.

While the embodiments of the present disclosure have been shown and described above, it is to be understood that the above embodiments are illustrative and are not to be construed as limiting the scope of the present disclosure. Changes, modifications, substitutions and variations may be made to the above embodiments by those skilled in the art within the scope of the present disclosure.

What is claimed is:

1. A DAS same-well monitoring real-time microseismic effective event identification method based on deep learning, comprising:
constructing a DAS-based horizontal well microseismic monitoring system;
constructing a training data set comprising microseismic event data, pipe wave data and background noise data with different types of labels;
constructing a signal identification module composed of a deep neural network, wherein the deep neural network comprises a convolution sub-network and an attention mechanism sub-network; input data of the signal identification module uses two convolution layers to extract basic features, with a data size of 256×256, and a convolution kernel of 32×3×3; the convolution sub-network comprises 2 convolution layers, with a data size of 256×256, and a convolution kernel of 32×3×3, where first dimension is a number of convolution, second dimension and third dimension are convolution size; the attention mechanism sub-network comprises 1 convolution layer and 2 pooling layers, the convolution layer has a data size of 256×256, and a convolution kernel of 32×3×3; the 2 pooling layers comprise 1 average pooling layer and 1 maximum pooling layer, the 2 pooling layers are connected to each other by a connected layer, and then use the convolution layer with a data size of 128×128, and a convolution kernel of 64×3×3; the convolution sub-network and the attention mechanism sub-network are connected to each other by a connected layer, and then two convolution layers with a data size of 128×128, and a convolution kernel of 64×3×3 are used; then, 2 fully connected layers with a size of 1024×1 are used; an input of the signal identification module comprises the microseismic event data, pipe wave data and background noise data with different types of labels, and an output of the signal identification module comprises a predicted label value, network parameters are updated by using an error of the predicted label value and an accurate label value; the deep neural network uses cross entropy as a loss function to calculate an error of the deep neural network;

training the signal identification module by using the training data set;

preprocessing actual monitoring data, inputting the preprocessed data into the signal identification module to obtain an output result; marking microseismic events identified in the output result, and updating the marked microseismic events into the training data set; and adjusting and updating the signal identification module.

2. The DAS same-well monitoring real-time microseismic effective event identification method based on deep learning according to claim 1, wherein the constructing a training data set comprises:

generating initial data of the microseismic event data, the pipe wave data and the background noise data;

data-augmenting the initial data of the microseismic event data, the pipe wave data and the background noise data; and preprocessing all data.

3. The DAS same-well monitoring real-time microseismic effective event identification method based on deep learning according to claim 2, wherein the initial data of the microseismic event data comprises a first part of data and a second part of data, the first part of data is data formed by adding actual collected pipe waves to artificially simulated and composited data which do not comprise pipe waves and background noise; the second part of data is microseismic event data obtained from actual monitoring and comprising pipe waves and background noise;

wherein the initial data of the pipe wave data is pipe wave data obtained from actual monitoring of a fracturing platform at an initial stage of fracturing; and/or wherein the initial data of the background noise data is mechanical noise of wellhead operation obtained through a same-well monitoring of an adjacent fracturing platform.

4. The DAS same-well monitoring real-time microseismic effective event identification method based on deep learning according to claim 3, wherein the updating the marked microseismic events into the training data set comprises updating the marked microseismic events into the second part of the initial data of the microseismic event data.

5. The DAS same-well monitoring real-time microseismic effective event identification method based on deep learning according to claim 2, wherein the data-augmenting the initial data of the microseismic event data, the pipe wave data and the background noise data comprises:

scaling amplitudes of the microseismic data, amplitudes of the pipe wave data and amplitudes of the background noise data according to random ratios.

6. The DAS same-well monitoring real-time microseismic effective event identification method based on deep learning according to claim 2, wherein the preprocessing all data comprises:

performing interpolation and replacement of damaged channel data by adjacent channels, removing mean value, removing abnormally large value, replacing the removed abnormally large value by interpolation, and performing data normalization.

7. The DAS same-well monitoring real-time microseismic effective event identification method based on deep learning according to claim 2, wherein the training the signal identification module by using the training data set comprises:

dividing the training data set into a training subset and a test subset with a ratio of 8:2;

letting a neural network model adopt a stochastic gradient descent optimization method;

setting a dynamic learning rate with an initial value being set to 0.0001, reduced by half every 50 times; a batch size being set to 40; a number of iterations being 200; and training the neural network model on a graphics processing unit.

8. The DAS same-well monitoring real-time microseismic effective event identification method based on deep learning according to claim 2, wherein the adjusting and updating the signal identification module comprises:

freezing a network structure of a feature extraction layer, keeping parameters of the feature extraction layer unchanged, training a mapping relationship between a feature output layer and a fully connected layer by using all the updated microseismic events and some old microseismic events in the data set, extracting features output by the last layer, adjusting the module by using new data, and re-establishing a mapping relationship between the feature output layer and the fully connected layer; and obtaining new network model parameters and updating the signal identification module simultaneously.

9. The DAS same-well monitoring real-time microseismic effective event identification method based on deep learning according to claim 2, wherein the DAS-based horizontal well microseismic monitoring system comprises a metal sleeve and an armored optical cable fixedly arranged outside the metal sleeve, and a single-mode optical fiber is arranged in the armored optical cable;

wherein the constructing a DAS-based horizontal well microseismic monitoring system comprises:

inserting the metal sleeve and the armored optical cable into a drilled wellbore synchronously;

pumping cement slurry from a bottom of a well, letting the cement slurry return to a wellhead from the bottom of the well along an annular space between an outer wall of the metal sleeve and the wellbore, allowing the metal sleeve, the armored optical cable and formation rock to be fixed together after the cement slurry is solidified; and providing a DAS modem, and connecting the single-mode optical fiber in the armored optical cable to a DAS signal input port of the DAS modem at the wellhead.

10. The DAS same-well monitoring real-time microseismic effective event identification method based on deep learning according to claim 1, wherein the preprocessing actual monitoring data comprises:

performing interpolation and replacement to damaged channel data by adjacent channels, removing mean value, removing abnormally large value, replacing the removed abnormally large value by interpolation, and performing data normalization.

* * * * *